US007675640B2

(12) United States Patent
Ishii et al.

(10) Patent No.: US 7,675,640 B2
(45) Date of Patent: Mar. 9, 2010

(54) NETWORK PRINTING SYSTEM, PRINTING TERMINAL AND PRINTING METHOD

(75) Inventors: Hirotomo Ishii, Toyonaka (JP); Norihisa Takayama, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1169 days.

(21) Appl. No.: 10/810,885

(22) Filed: Mar. 29, 2004

(65) Prior Publication Data

US 2004/0239984 A1 Dec. 2, 2004

(30) Foreign Application Priority Data

May 28, 2003 (JP) .............................. 2003-150444

(51) Int. Cl.
*G06F 15/00* (2006.01)
*G06F 9/44* (2006.01)
(52) U.S. Cl. .......................................... 358/1.15; 705/7
(58) Field of Classification Search ................ 358/1.15, 358/1.16, 1.18, 1.1, 405, 402, 468; 705/7, 705/14, 28, 26, 35; 715/748, 209, 221, 273, 715/222, 226, 744; 379/100.05, 449, 254, 379/465; 382/100; 709/200, 202, 203, 225; 400/76

See application file for complete search history.

(56) References Cited

U.S. PATENT DOCUMENTS 5,287,194 A * 2/1994 Lobiondo .................... 358/296

5,467,434 A * 11/1995 Hower et al. ................ 358/1.15

FOREIGN PATENT DOCUMENTS

| JP | 9-106223 | 4/1997 |
|----|----------|--------|
| JP | 9-185472 | 7/1997 |
| JP | 11-175267 | 7/1999 |
| JP | 2002-49472 | 2/2002 |
| JP | 2002-318852 | 10/2002 |

OTHER PUBLICATIONS

Japanese Office Action mailed on Dec. 2, 2008 directed towards counterpart foreign application No. 2003-150444; 5 pages.

* cited by examiner

*Primary Examiner*—Saeid Ebrahimi Dehkordy
(74) *Attorney, Agent, or Firm*—Morrison & Foerster LLP (57) ABSTRACT

In a network printing system, initial print setting information and save-mode print setting information are preparatorily set as print setting information in a server. In response to a request from PC1 or PC2, the server sends the save-mode print setting information as the "print setting information" if the total number of print copies exceeds a predetermined number. If a user does not agree with the save-mode print setting information displayed on the PC1 or PC2, the user operates a button "no" in a confirmation dialogue and then resets the print setting information. A printing apparatus performs save-mode printing or normal printing in accordance with the set or reset print setting information. Therefore, an administrator of the network printing system has only to set the initial print setting information and the save-mode print setting information in the server. Thus, the network printing system allows print setting to be simply achieved.

8 Claims, 5 Drawing Sheets

Use save-mode print setting that has been set in server.
Use save-mode print setting for printing?

Yes     No

Fig.5

NETWORK PRINTING SYSTEM, PRINTING TERMINAL AND PRINTING METHOD

This application is based on application No. 2003-150444 filed in Japan, the entire content of which is hereby incorporated by reference.

BACKGROUND OF THE INVENTION

The present invention relates to a network printing system composed of personal computers (hereinafter, abbreviated to PCs), a server and a printing apparatus such as printers and MFPs (Multiple Function Peripherals), each of which is connected to a network.

In recent years, use of printing apparatuses connected to a network such as LAN (Local Area Network) has been becoming mainstream in business offices. Such printing apparatuses connected a network include, for example, the ones disclosed in a first prior art (JP 2002-318852A) and a second prior art (JP H11-175267A).

In a printing management system disclosed in the first prior art, a shop that is a printing shop having printers, a client PC, and a center server can communicate with each other via the Internet. For printing created documents and the like, the client PC creates print data based on print settings set by a user in accordance with attribute information (device characteristics, paper sizes and the like of each printer of the shop) in a printer information description file. Further, while storing information such as shop specification and print option specification as print setting information, the client PC creates a print order containing the print setting information and a printer-dedicated description language file based on the print data, and uploads the print order to the center server via the Internet.

Then, based on the received print setting information, the center server tentatively stores the print order in a transfer unit in the case where a specified shop is a printing shop that is categorized to dial-up access to the Internet, and the center server transmits the stored print order when accessed by the corresponding shop. The shop outputs the printer-dedicated description language file to a printer according to the print setting information contained in the received print order. Then the printer prints out the printer-dedicated description language file according to the description of the print setting information.

Further, in the print control system disclosed in the second prior art, a printer is connected to a host computer via a two-way interface such as local networks, and the host computer and a plurality of host computer systems are connected to a wide-area network. A hard disk of one host computer system has stored a printer driver, setup utilities, printer setting information and an instruction manual corresponding to the printer.

In a ROM (Read Only Memory) of the printer, there are stored location information for indicating respective locations at which the printer driver, the setup utilities, the printer setting information and the instruction manual are stored on the wide-area network. The location information is sent to the host computer via the two-way interface by an instruction from the host computer and stored in a ROM of the host computer.

After these steps, the host computer establishes a connection to a server specified by the positional information on the wide-area network contained in the location information, and downloads print control information such as the printer driver, the setup utilities, the printer setting information and the instruction manual.

However, the printing management system disclosed in the first prior art and the printer control system disclosed in the second prior art have the following problems.

That is, in recent years, department management in printing operation has been being practiced, for example, by setting the upper limit of the number of print copies on the department basis. In such a case where the upper limit of the number of print copies is set on the department basis, it is extremely inconvenient for users if the printing operation is stopped immediately when the number of print copies reaches the upper limit. Accordingly, there is a case where printing in save mode such as 2-in-1 printing mode and two-side printing mode is automatically conducted once the number of printed copies has reached a specified number that is lower than the upper limit.

In this connection, in the printing management system disclosed in the first prior art, print setting information is created by the client PC and is sent from the center server to a shop, and the shop outputs the printer-dedicated description language file to a printer in accordance with the received print setting information. Therefore, in the case of setting the save-mode printing, it is necessary for the client PC side to create the print setting information including the setting of the save-mode printing.

Further in the printer control system disclosed in the second prior art, location information on the print control information is obtained from the ROM of the printer by the host computer, and based on the obtained location information, the print control information connected to the wide-area network is downloaded. Therefore, in the case of setting the save-mode printing, it is necessary to store the setting of the save-mode printing and its location information in the printer and the hard disk of the one host computer system.

Consequently, in cases where the save-mode printing is set in the conventional network printing system, a network administrator needs to set up individual client PCs as well as a host computer system and a printer for the save-mode printing, which is considerably troublesome as a disadvantage. Alternatively, it is necessary to well acquaint each user with the set-up of each client PC for the save-mode printing, as another problem.

SUMMARY OF THE INVENTION

Accordingly, an object of the present invention is to provide a network printing system which allows print setting to be simply achieved without imposing a load on a network administrator and each user.

In order to accomplish the above object, there is provided a network printing system comprising:

a network;

a terminal that is connected to the network and that orders a print job;

a printing apparatus that is connected to the network and that performs printing in accordance with the print job; and a server that is connected to the network and that delivers the print job derived from the terminal to the printing apparatus, wherein the network printing system includes:

a print setting information storage section which is provided in the server and which stores therein print setting information that is set by input;

a print setting information acquisition section for acquiring the print setting information set in the server;

a confirmation message presentation section for presenting to a user a confirmation message for confirming printing based on the acquired print setting information;

a resetting section for resetting the acquired print setting information; and a print job creation section for creating the print job based on the reset print setting information.

It is to be noted that the aforementioned "print setting information" refers to information such as "paper size, print direction, color mode, printing method (one-side printing, two-side printing), page layout, toner saving function", which needs to be set in advance when the printing apparatus performs printing. The aforementioned "print job" refers to a "print command" composed of a set of data such as documents and graphics that are subject to printing and the print setting information.

In the network printing system of the present invention, when a user gives a print order from the terminal to the printing apparatus connected to the network, the print setting information set in the server is confirmed by a confirmation message. In the case where printing is not performed based on the print setting information set in the server, the acquired print setting information is reset so that a print job based on the reset print setting information is created and delivered to the printing apparatus.

More specifically, an administrator of the network printing system does not have to set print setting information in individual terminals but has only to set it in the server alone. This makes it possible to take some of the load off the administrator of the network printing system.

If the print setting information set in the server is save-mode print setting information such as "2-in-1 printing mode" and "two-side printing mode" and if a user is to print a "contract document" which cannot accept save-mode printing, then the print setting information can be reset to normal print setting information so that the "contract document" can be printed with optimum print setting.

Further, according to one embodiment, in the case where the user agrees with the confirmation message, the print job creation section creates the print job based on the acquired print setting information.

In this embodiment, in the cases where printing is performed based on the print setting information set in the server, a print job based on the acquired print setting information is created and delivered to the printing apparatus.

Thus, if the print setting information set in the server is save-mode print setting information such as "2-in-1 printing mode" and "two-side printing mode" and if a user is to print matter that accepts save-mode printing, then the save-mode printing is performed.

According to one aspect of the invention, there is provided a printing terminal comprising:

a print setting information acquisition section for transmitting an acquisition request for print setting information to a server in which the print setting information is stored and for acquiring the print setting information;

a confirmation message presentation section for presenting to a user a confirmation message for confirming printing based on the acquired print setting information;

a resetting section for resetting the acquired print setting information in accordance with an instruction from the user; and a print job creation section for creating the print job based on the acquired print setting information or the reset print setting information and for transmitting the print job to the server.

According to another aspect of the invention, there is provided a printing method comprising:

transmitting an acquisition request for print setting information to a server via a network to acquire the print setting information set in the server;

presenting to a user a confirmation message for confirming printing based on the acquired print setting information;

resetting the acquired print setting information in accordance with an instruction from a user;

creating a print job based on the acquired print setting information or the reset print setting information; and transmitting the created print job to a printing apparatus via the network so as to make the printing apparatus perform printing in accordance with the print job.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
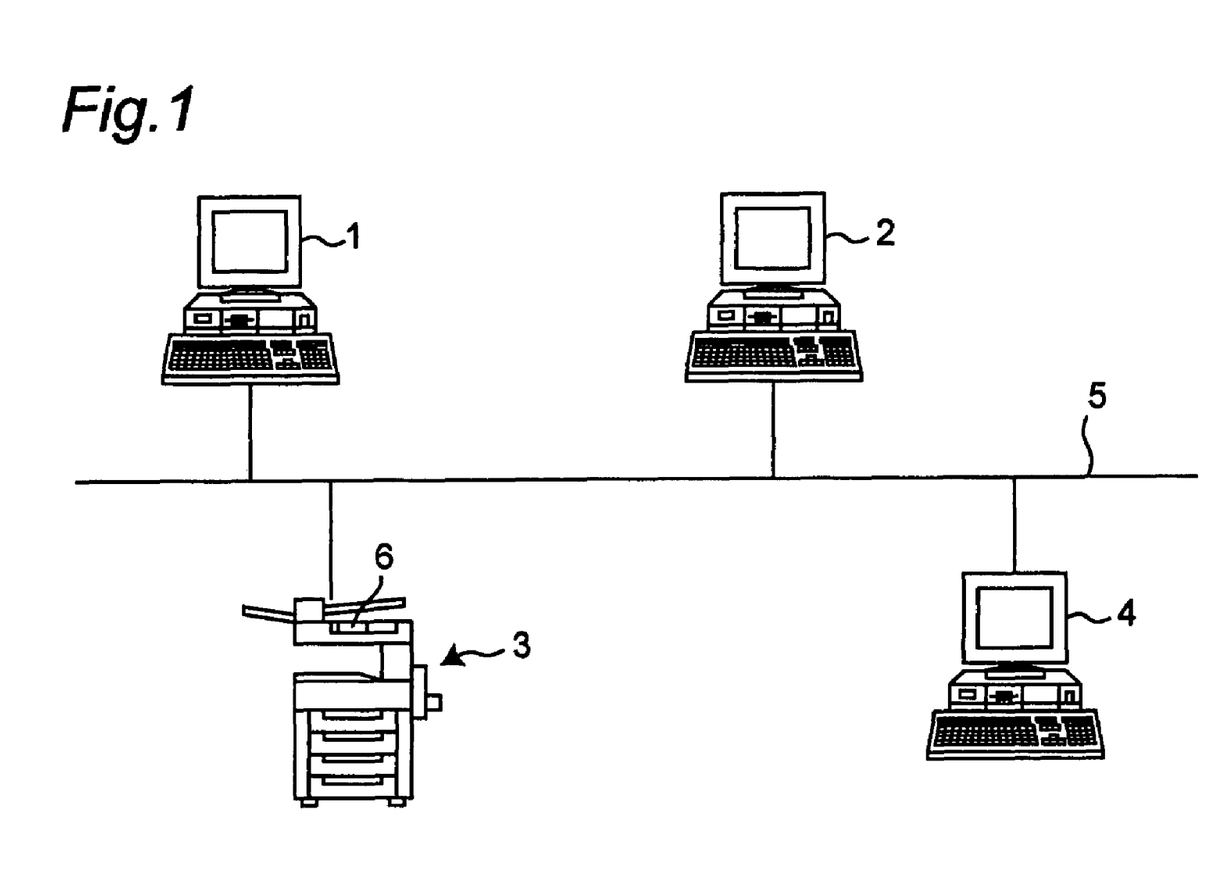
FIG. 1 is a view showing a configuration example of a network printing system of the present invention.

The present invention will be described in detail below in conjunction with the embodiments with reference to the accompanying drawings. FIG. 1 is a view showing a configuration example of the network printing system in this embodiment. The network printing system is composed of a printing apparatus 3, a plurality (two in this embodiment) of PC (Personal Computer) 1, PC2 as terminals that order print jobs to the printing apparatus 3, and a server 4 that temporarily receives the print jobs from the PC1, PC2 and makes the printing apparatus 3 execute printing, each connected so as to be exchange data and information with each other via a network 5 such as LANs.

The printing apparatus 3, which is embodied by a printer, an MFP or the like, is composed of a communication section (not shown) for controlling data transfer to and from the server 4 via the network 5, an operation panel 6 for users to perform various operations including key entry, an image forming section (not shown) for forming images on paper fed from a feeder port, and a control section (not shown) for making the image forming section execute printing based on the print job received via the network 5. Then, upon reception of a print job from the server 4, the printing apparatus 3 executes printing and sends printing result information such as a total number of print copies and a total quantity of used toner to the server 4 via the network 5 from the communication section.

It is to be noted that the MFP refers to a printing apparatus having a function of scanning an original image and printing its copy image on paper (copy job function), a function of printing images received from the PC1, PC2 or images received by e-mail via a mail server (not shown) (print job function), and a function of transmitting image information obtained by scanning an original image by e-mail (image information transmission job function).

The server 4 has a function of delivering a print job received from the PC1, PC2 to the printing apparatus 3. In a built-in RAM (Random Access Memory), initial setting information (hereinafter, referred to as initial print setting information) such as "paper size, print direction, color mode, printing method (one-side printing, two-side printing), page layout, toner-save function", and save-mode print setting information (such as 2-in-1 printing mode, two-side printing mode, toner-save mode, black-and-white printing mode) are set in advance as print setting information by an administrator of the network printing system. The server 4 also monitors printing result information from the printing apparatus 3, and if the total number of print copies and the total quantity of used toner are not more than predetermined values, the server 4 sends the initial print setting information as "print setting information" in response to a request from the PC1, PC2. On the other hand, if the total number of print copies and the total quantity of used toner are above the predetermined values, then the save-mode printing setting information is sent as the "print setting information".

The PC1, PC2 are each composed of a CPU (Central Processing Unit), a program memory, a data memory, a communication interface, an input device, an output device, a display device, an external auxiliary storage unit and the like, and has a function of ordering print jobs to the printing apparatus 3 as described above. In doing so, the PC1, PC2 give an acquisition request for the print setting information to the server 4 as described above, and if they receive the save-mode print setting information, then they output the received save-mode print setting information on the display screen together with a message for prompting save-mode printing. Then, the print job is created based on the received initial print setting information or the save-mode print setting information or either one of the two sets of information corrected by a user.

Description is hereinbelow given of the operation of the network printing system having the above configuration. Here is assumed that the network printing system is for use in one department in one company, and in this company, there is set a total number N of print copies allowed for each department per month. It is also assumed that "paper size=A4, print direction=vertical, color mode=color, printing method=one-side printing, page layout=one side 1P, toner-save function=disabled" are set as the initial print setting information, and that "color mode=black, printing method=two-side printing, page layout=front page 1P/back page 2P, toner-save function=enabled" are set as the save-mode print setting information for the server 4 by a network printing system administrator of that department. It is further assumed that as the "print setting information", the total number of print copies, which is a criterion for determining that the save-mode print setting information be transmitted, is set to "N' (<N)."

Figure 2:
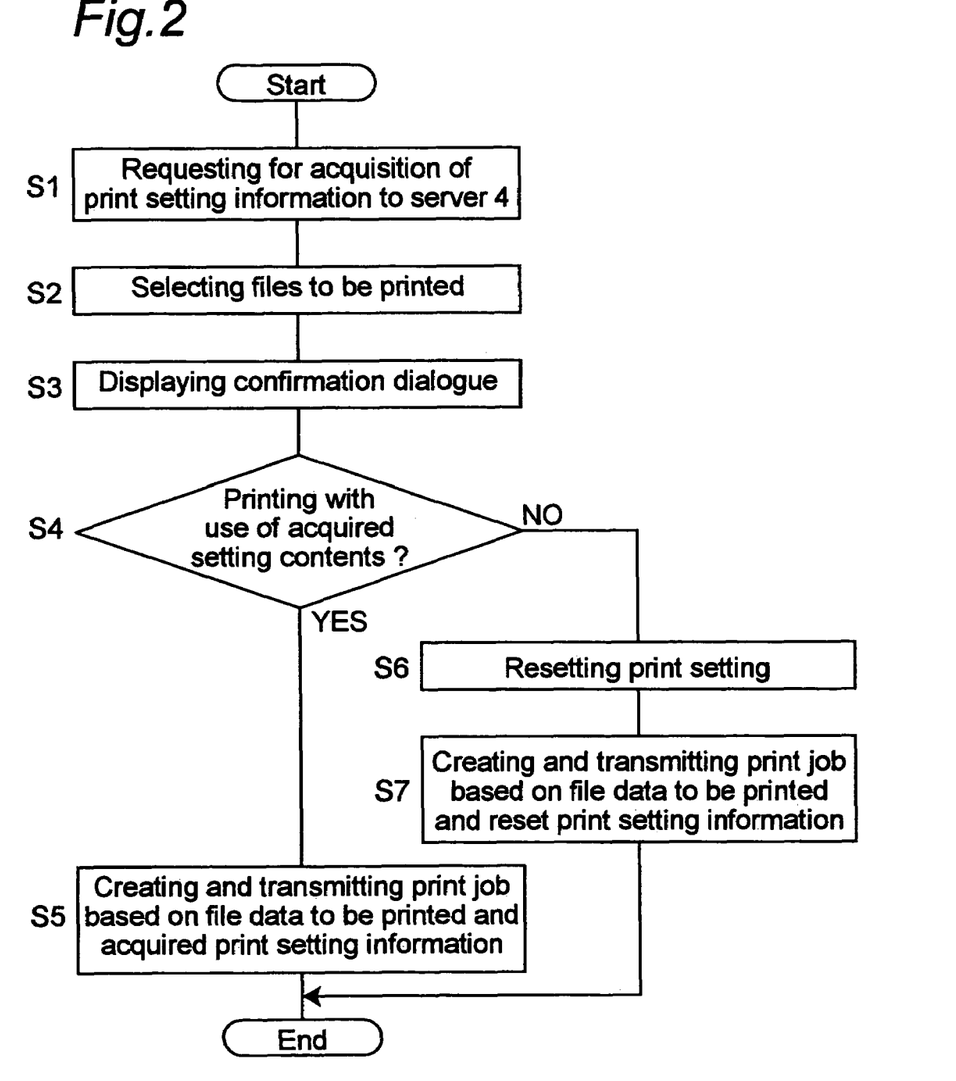
FIG. 2 is a flowchart showing a printing processing operation executed by a PC in FIG. 1.

FIG. 2 is a flowchart showing a printing processing operation executed by the CPU of the PC1 (or PC2). Once the PC1 (or PC2) is activated, the printing processing operation starts.

In step S1, an acquisition request for the "print setting information" is transmitted to the server 4. In this case, it is assumed that the total number of print copies is already above "N'." Then, the save-mode print setting information as a response to the acquisition request is received and stored in the data memory. In step S2, data of a file to be printed is selected from the data memory. In step S3, the save-mode print setting information stored in the data memory is displayed on the display device as shown as an example in FIG. 3, and also a confirmation dialogue containing a message for prompting the save-mode printing is displayed as shown as an example in FIG. 4.

In step S4, based on a button of the confirmation dialogue operated by the user, it is discriminated whether or not printing is performed with use of print setting (save-mode print setting) contents acquired in the step S1. As a result, if printing is performed with use of the save-mode print setting contents (if a button "yes" is operated), then the procedure proceeds to step S5, whereas if it is not performed (a button "no" is operated), then the procedure proceeds to step S6. Here, the button "no" would be operated in such cases that the document to be printed is one that should not be save-mode printed, such as "contract documents."

Figure 3:
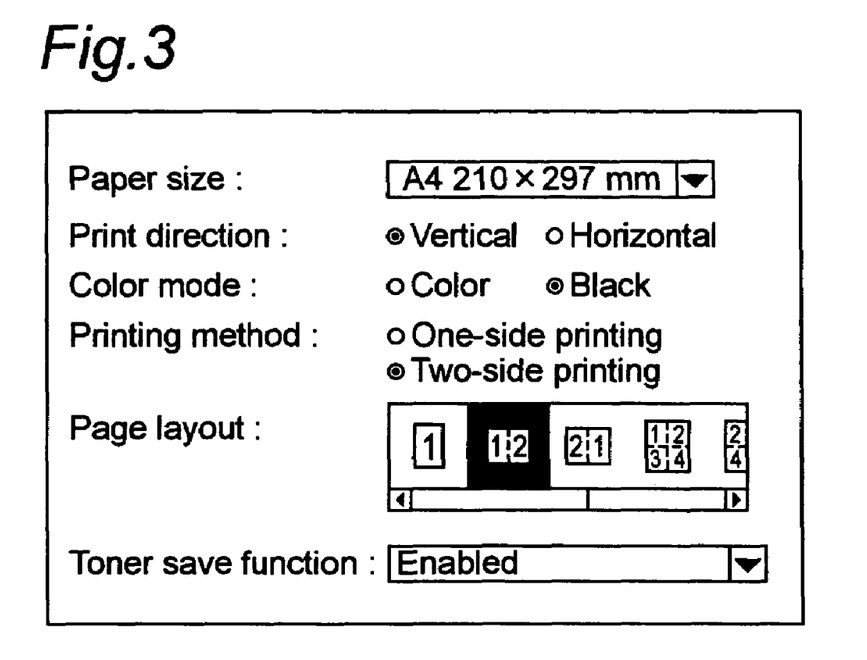
FIG. 3 is a view showing a display example of save-mode print setting information.
Figure 4:
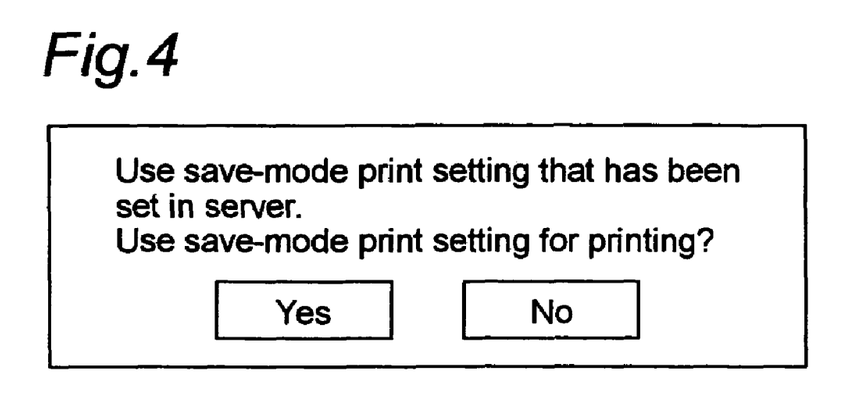
FIG. 4 is a view showing a display example of a confirmation dialogue.
Figure 5:
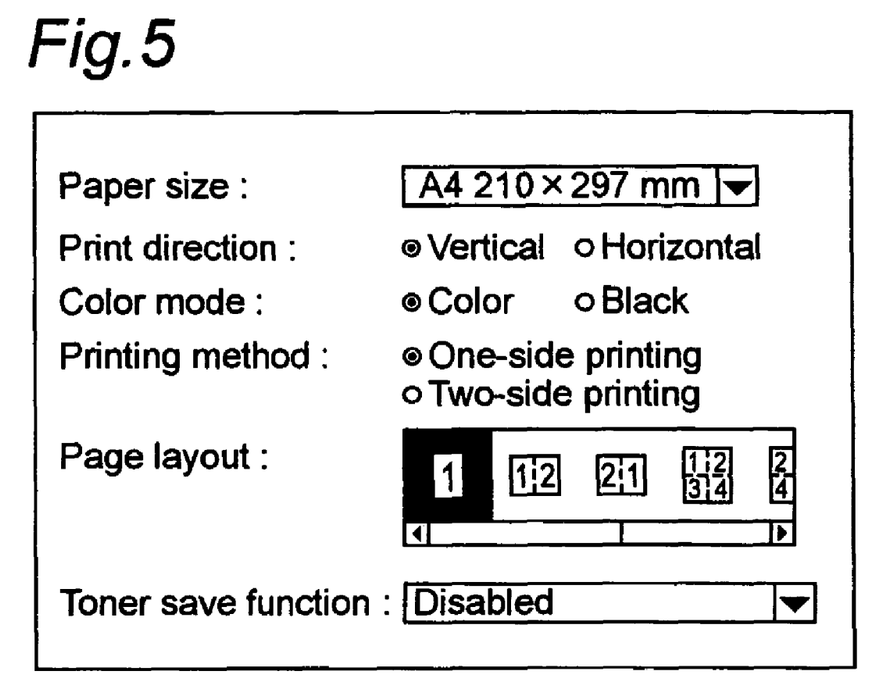
FIG. 5 is a view showing a display example of reset print setting information.

In step S5, based on the file data selected in the step S2 and the print setting information acquired in the step S1, the print job is created and sent to the server 4. The server 4 then sends the received print job to the printing apparatus 3. Thus, once the save-mode printing is started by the printing apparatus 3, the printing processing operation is terminated. In step S6, the save-mode print setting information shown in FIG. 3 is corrected by the user and the print setting information is reset as shown as an example in FIG. 5. In step S7, based on the file data selected in the step S2 and the print setting information reset in the step S6, the print job is created and sent to the server 4. The server 4 then sends the received print job to the printing apparatus 3. Thus, once the printing is started by the printing apparatus 3, the printing processing operation is terminated.

It is to be noted that although in the printing processing operation shown in FIG. 2, an acquisition request for the "print setting information" is made upon activation of individual PC1, PC2, it is totally acceptable if the acquisition request for the "print setting information" is given upon start of printing. Description is now given of the printing processing operation of the PC1 (or PC2) in the case where the acquisition request for the "print setting information" is given upon start of printing with reference to the flowchart in FIG. 6. Once the PC1 (or PC2) is activated, the printing processing operation starts.

Figure 6:
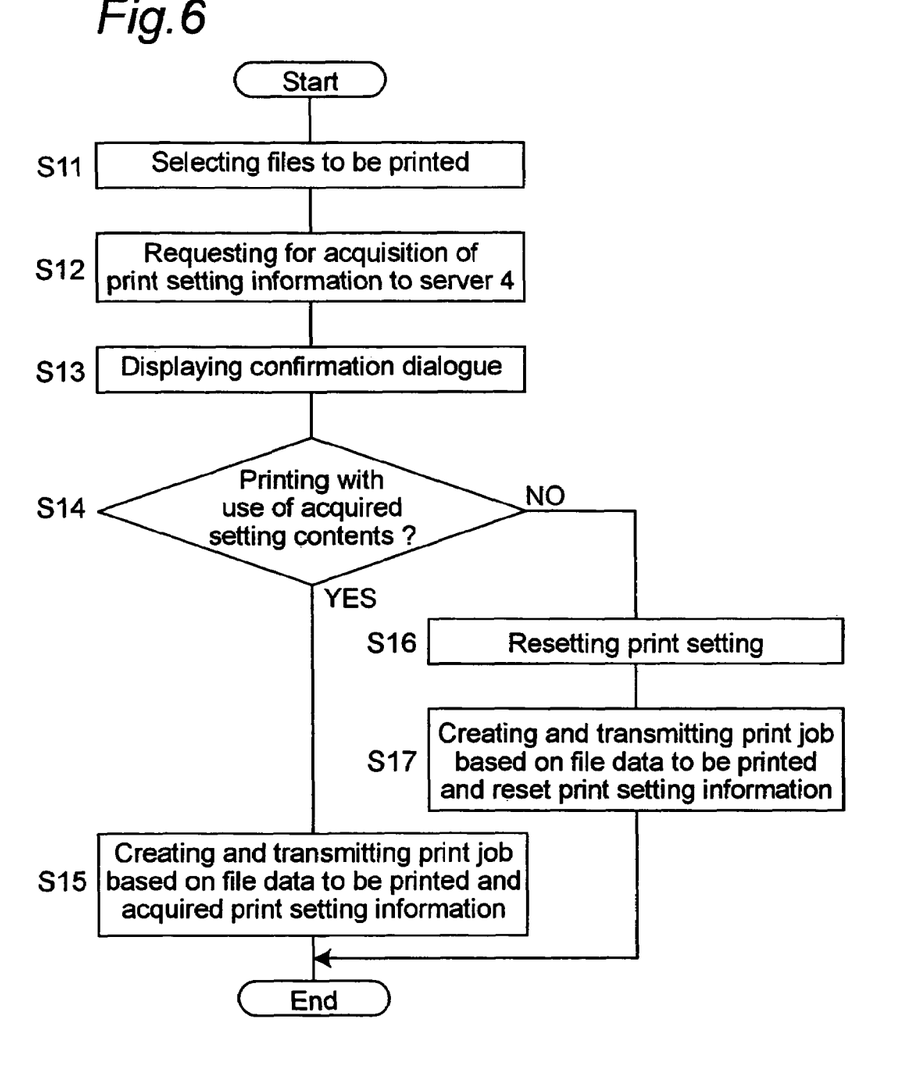
FIG. 6 is a flowchart showing a printing processing operation different from that of FIG. 2.

In step S11, data of a file to be printed is selected from the data memory. In step S12, an acquisition request for the "print setting information" is sent to the server 4. In this case, it is assumed that the total number of print copies has already exceeded "N'". Then, the save-mode print setting information as a response to the acquisition request is received and stored in the data memory.

In steps S13 to S17, as with the steps S3 to S7 in the printing processing operation shown in FIG. 2, there are executed display of a confirmation dialogue including the save-mode print setting information and a message for prompting the save-mode printing, discrimination as to the use of acquired print setting contents based on the button operation of the confirmation dialogue, creation of the print job based on the selected file data and the save-mode print setting information and its transmission to the server 4, resetting of the save-mode print setting information by the user, and creation of the print job based on the selected file data and the reset print setting information and its transmission to the server 4. Then, once the save-mode printing or normal printing is started by the printing apparatus 3, the printing processing operation is terminated.

As shown above, in the present embodiment, the initial print setting information and the save-mode print setting information are preparatorily set in the server 4 as the print setting information. In response to the request from the PC1 or the PC2, the initial print setting information is normally transmitted as the "print setting information", whereas if the total number of print copies exceeds the preset number N', then the save-mode print setting information is transmitted. Then, the PC1 or the PC2 creates the print job based on the print setting information and sends it to the server 4. Therefore, an administrator of the network printing system has only to set the initial print setting information and the save-mode print setting information in the server 4.

Consequently, according to this embodiment, the network administrator does not need to set save-mode printing in individual client PCs as well as the host computer system and the printer as in the conventional network printing system. It is also not necessary to instruct each user to set up each user's client PC for save-mode printing. Thus, print setting such as the initial print setting information and the save-mode print setting information can be easily performed without putting a load on the network administrator.

Further, in the case where the user does not desire to agree with the save-mode print setting information displayed on the PC1 or the PC2, "no" in the confirmation dialogue displayed on the PC1 or the PC2 is operated to correct the save-mode print setting information. Then, the PC1 or the PC2 sends the print job based on the reset print setting information to the server 4. Therefore, it becomes possible to print documents with normal print setting if the documents are those inhibited from save-mode printing such as "contract documents."

It is to be noted that in the above embodiment, description has been made by way of example on a case where the total number N of print copies per month is set and when the total number of print copies reaches N' (<N), the "save-mode print setting information" is set as the "print setting information". However, the present invention is not limited to this, and it is also possible to set the total quantity of used toner T per month and to adopt toner-save mode once the total quantity of used toner reaches T' (<T).

Further, the network administrator may set in advance "toner-save function=enabled" as the initial print setting information so as to previously apply the save-mode print setting. In this case, if the user agrees with the displayed print setting, printing is performed in toner-save mode. Also, in the case where the network administrator sets "color mode=black" as the initial print setting information, black-and-white printing is performed if the user agrees with the displayed print setting, whereas if the user needs color printing, the button "no" in the confirmation dialogue is operated to overwrite the setting to "color mode=color" so that color printing is performed.

Thus, whether or not the save-mode print setting information is set in advance as the initial print setting information is not limited in the present invention but may appropriately be determined by the network administrator as required (in such case that paper or toner quantity of use is larger than expected).

Further, in the case where it is determined in the step S4 or the step S14 in the printing processing operation shown in FIG. 2 or FIG. 6 that printing is performed without use of the save-mode print setting information (in the case where the button "no" in the confirmation dialogue is operated), the initial print setting information may be displayed as default setting information before the save-mode print setting information is corrected by the user in the step S6 or the step S16.

As is clear from the above description, according to the network printing system of the present invention, an administrator of the network printing system does not have to set print setting information in individual terminals but has only to set the information in the server alone. This makes it possible to take some of the load off the administrator of the network printing system. Further, since the print setting information acquired from the server can be reset, printing with normal print setting is implementable even in the case where the save-mode print setting information has been set in advance in the server and where the user prints "contract documents for which the save-mode printing is inappropriate.

Further, according to the network printing system in one embodiment, save-mode printing is implementable in the case where the save-mode print setting information has been set in advance in the server and the user agrees with the confirmation message.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A network printing system comprising:
    a terminal that is connected to a network and that orders a print job;
    a printing apparatus that is connected to the network and that performs printing in accordance with the print job;
    a server that is connected to the network and that delivers the print job derived from the terminal to the printing apparatus;
    a print setting information storage section which is provided in the server and which stores therein print setting information that is set by input;
    a print setting information acquisition section for acquiring the print setting information set in the server;
    a confirmation message presentation section for presenting to a user a screen indicating a confirmation message for confirming printing based on the acquired print setting information and accepting input by the user as to whether the printing is agreed or not;
    a resetting section for resetting the acquired print setting information in accordance with an instruction from the user if the printing is not agreed by the user, as indicated the input accepted by the confirmation message presentation section; and
    a print job creation section for creating the print job based on the acquired print setting information when the user agrees with the confirmation message and creating the print job based on the reset print setting information when the user does not agree with the confirmation message, and sending the created print job to the server.

2. The network printing system as defined in claim 1, wherein
    the print setting information acquisition section, the confirmation message presentation section, the resetting section and the print job creation section are mounted on the terminal.

3. The network printing system as defined in claim 1, wherein
    the print setting information contains initial print setting information and save-mode print setting information.

4. The network printing system as defined in claim 3, wherein
    the printing apparatus transmits printing result information to the server every time printing is performed, and
    the server monitors the printing result information derived from the printing apparatus, and when contents of the printing result information satisfy predetermined conditions, the save-mode print setting information is transmitted as the print setting information to the print setting information acquisition section.

5. A printing terminal comprising:

a print setting information acquisition section for transmitting an acquisition request for print setting information to a server in which the print setting information is stored and for acquiring the print setting information;

a confirmation message presentation section for presenting to a user a screen indicating a confirmation message for confirming printing based on the acquired print setting information and accepting input by the user as to whether the printing is agreed or not;

a resetting section for resetting the acquired print setting information in accordance with an instruction from the user if the printing is not agreed by the user; and a print job creation section for creating the print job based on the acquired print setting information when the user agrees with the confirmation message and creating the print job based on the reset print setting information when the user does not agree with the confirmation message, and for transmitting the created print job to the server.

6. The printing terminal as defined in claim 5, wherein the print setting information contains initial print setting information and save-mode print setting information.

7. A printing method comprising:

transmitting an acquisition request for print setting information to a server via a network to acquire the print setting information set in the server;

presenting to a user a screen indicating a confirmation message for confirming printing based on the acquired print setting information;

accepting input by the user as to whether or not printing is agreed based on the acquired print setting information;

resetting the acquired print setting information in accordance with an instruction from the user if the printing is not agreed by the user;

creating a print job based on the acquired print setting information when the user agrees with the confirmation message and creating the print job based on the reset print setting information when the user does not agree with the confirmation message; and transmitting the created print job to a printing apparatus via the network so as to make the printing apparatus perform printing in accordance with the print job.

8. The printing method as defined in claim 7, wherein the print setting information contains initial print setting information and save-mode print setting information.

* * * * *